United States Patent
Shah et al.

(10) Patent No.: US 12,464,430 B2
(45) Date of Patent: Nov. 4, 2025

(54) LMF ASSISTED MRO

(71) Applicant: Nokia Technologies Oy, Espoo (FI)

(72) Inventors: Kunjan Himanshubhai Shah, Munich (DE); Sina Khatibi, Munich (DE); Ingo Viering, Munich (DE); Ahmad Awada, Munich (DE)

(73) Assignee: Nokia Technologies Oy, Espoo (FI)

( * ) Notice: Subject to any disclaimer, the term of this patent is extended or adjusted under 35 U.S.C. 154(b) by 314 days.

(21) Appl. No.: 18/261,288

(22) PCT Filed: Dec. 7, 2021

(86) PCT No.: PCT/FI2021/050845
§ 371 (c)(1),
(2) Date: Jul. 13, 2023

(87) PCT Pub. No.: WO2022/157414
PCT Pub. Date: Jul. 28, 2022

(65) Prior Publication Data
US 2024/0073770 A1 Feb. 29, 2024

Related U.S. Application Data

(60) Provisional application No. 63/141,103, filed on Jan. 25, 2021.

(51) Int. Cl.
*H04W 36/00* (2009.01)
*H04W 36/32* (2009.01)

(52) U.S. Cl.
CPC ..... *H04W 36/32* (2013.01); *H04W 36/00833* (2023.05); *H04W 36/0083* (2013.01)

(58) Field of Classification Search
None
See application file for complete search history.

(56) References Cited

U.S. PATENT DOCUMENTS 8,213,957 B2 7/2012 Bull et al.
2010/0173626 A1 7/2010 Catovic et al.
(Continued)

FOREIGN PATENT DOCUMENTS

EP 2955962 A1 12/2015
EP 2767118 B1 4/2016
(Continued)

OTHER PUBLICATIONS

"3rd Generation Partnership Project; Technical Specification Group Radio Access Network; Study on NR positioning support (Release 16)", 3GPP TR 38.855, V16.0.0, Mar. 2019, pp. 1-197.
(Continued)

*Primary Examiner* — Idowu O Osifade
(74) *Attorney, Agent, or Firm* — Barta Jones, PLLC

(57) ABSTRACT

A system, apparatus, method, and non-transitory computer readable medium for providing location management function (LMF) assisted mobility robustness optimization (MRO) may include a radio access network (RAN) node which is caused to, collect network handover information associated with at least one first user equipment (UE) device, determine whether to update a mobility policy associated with the RAN node based on the collected network handover information and a desired threshold condition, perform a first mobility policy update procedure for the RAN node
(Continued)

based on results of the determination, receive current location information corresponding to at least one second UE device traveling between the at least one cell pair from a location management function (LMF) network device, and assign updated mobility configuration parameters to the at least one second UE device.

15 Claims, 8 Drawing Sheets

(56) References Cited

U.S. PATENT DOCUMENTS

| | | | |
|---|---|---|---|
| 2015/0245261 | A1 | 8/2015 | Tayeb et al. |
| 2018/0152875 | A1* | 5/2018 | Kapoulas ............ H04W 64/006 |
| 2020/0092776 | A1 | 3/2020 | Edge |

FOREIGN PATENT DOCUMENTS

| | | |
|---|---|---|
| WO | 2011/142567 A2 | 11/2011 |
| WO | 2013/034191 A1 | 3/2013 |
| WO | 2015/179309 A1 | 11/2015 |
| WO | 2019/096389 A1 | 5/2019 |
| WO | 2020/164697 A1 | 8/2020 |
| WO | 2021/197591 A1 | 10/2021 |

OTHER PUBLICATIONS

Awada, "Inter-Rat Mobility Robustness Optimization in Self-Organizing Networks", Dissertation, 2014, 212 pages.

"Msc-generator", Sourceforge, Retrieved on Jul. 4, 2023, Webpage available at : https://sourceforge.net/projects/msc-generator/.

Markopoulos et al., "Increased handover performance in 2G and 3G wireless systems based on combined mobile-location and area", The 5th International Symposium on Wireless Personal Multimedia Communications, Oct. 27-30, 2002, pp. 47-51.

International Search Report and Written Opinion received for corresponding Patent Cooperation Treaty Application No. PCT/FI2021/050845, dated Mar. 1, 2022, 17 pages.

"3rd Generation Partnership Project; Technical Specification Group Services and System Aspects; 5G System (5GS) Location Services (LCS); Stage 2 (Release 16)", 3GPP TS 23.273, V16.5.0, Dec. 2020, pp. 1-97.

Extended European Search Report received for corresponding European Patent Application No. 21920899.8, dated Nov. 27, 2024, 12 pages.

* cited by examiner

| SOURCE CELL ID | TARGET CELL ID | SOURCE AREA ID | CIO | TTT |
|---|---|---|---|---|
| Cell_1 | Cell_2 |  | +3db | 100 ms |
| Cell_1 | Cell_2 | 1 | -2db | 95 ms |
| Cell_1 | Cell_2 | 2 | +4db | 120 ms |
| Cell_1 | Cell_3 |  | -1db | 90 ms |
| Cell_1 | Cell_4 |  | +1db | 110 ms |
| Cell_1 | Cell_5 |  | +1db | 110 ms |

FIG. 7

LMF ASSISTED MRO

RELATED APPLICATION

This application was originally filed as PCT Application No. PCT/FI2021/050845 on Dec. 7, 2021, which claims priority from U.S. Provisional Application No. 63/141,103, filed on Jan. 25, 2021, both of which are incorporated herein by reference in their entirety.

BACKGROUND

Field

Various example embodiments relate to methods, apparatuses, systems, and/or non-transitory computer readable media for providing location management function (LMF) assisted mobility robustness optimization (MRO) for user equipment (UE) devices traveling between network cells.

Description of the Related Art

A $5^{th}$ generation mobile network (5G) standard, referred to as 5G New Radio (NR), is being developed to provide higher capacity, higher reliability, and lower latency communications than the 4G long term evolution (LTE) standard. One of the advantages of the 5G standard is the implementation of enhanced positioning determination and/or improved velocity measurement of UE devices connected to the 5G wireless network provided by location management function (LMF) network devices residing on the core network. Moreover, the 5G standard attempts to provide higher reliability through improved mobility robustness optimization (MRO) for connected UE devices which attempts to decrease radio link failures (RLFs) due to cell handover failures, such as too early (TE) handovers, too late (TL) handovers, handovers to the wrong cell, ping-pong handovers (wherein a UE device will repeatedly be handed over to different RAN nodes due to network congestion conditions and/or load-balancing policies, etc.), experienced by UE devices when traveling between the cell coverage areas (e.g., serving areas) of different radio access network (RAN) nodes, or while being positioned in areas where multiple cell coverage areas overlap and the UE device may connect to multiple RAN nodes.

SUMMARY

At least one example embodiment is directed towards a radio access network (RAN) node.

In at least one example embodiment, the RAN node may include a memory having computer readable instructions stored thereon, and processing circuitry configured to execute the computer readable instructions to cause the RAN node to, collect network handover information associated with at least one first user equipment (UE) device traveling between at least one cell pair, the at least one cell pair including a cell served by the RAN node and at least one neighboring cell of the RAN node, determine whether to update a mobility policy associated with the RAN node based on the collected network handover information and a desired threshold condition, perform a first mobility policy update procedure for the RAN node based on results of the determination, receive current location information corresponding to at least one second UE device traveling between the at least one cell pair from a location management function (LMF) network device in response to the performed first mobility policy update procedure, and assign updated mobility configuration parameters to the at least one second UE device based on the received current location information of the at least one second UE device and mapping information associated with the cell served by the RAN node, the mapping information including a plurality of boundary areas associated with the at least one cell pair.

Some example embodiments provide that the RAN node is further caused to transmit positioning service requests for each of the at least one first UE device to the LMF network device, receive position information corresponding to each of the at least one first UE device from the LMF network device in response to the transmitted positioning service requests, and collect the received position information as historical position information for the at least one first UE device.

Some example embodiments provide that the RAN node is further caused to perform the first mobility policy update procedure by transmitting the historical position information to a centralized entity (CE) network device for each of the at least one first UE device, the historical position information including the network handover information corresponding to the at least one first UE device, and receiving the updated mobility configuration parameters from the CE network device.

Some example embodiments provide that in response to the transmitted positioning information, the CE network device is caused to generate the mapping information based on the historical position information and the network handover information, the generating the mapping information including determining boundaries for the plurality of boundary areas based on handover failure type information associated with each of the plurality of boundary areas included in the network handover information, update the mobility configuration parameters for each of the plurality of boundary areas, transmit the determined mapping information to the LMF network device, and transmit the updated mobility configuration parameters to the RAN node, and the RAN node is further caused to receive the current location information corresponding to each of the at least one second UE device from the LMF network device, the current location information including a boundary area identifier of a current boundary area corresponding to the current location of the at least one second UE device, and assign the updated mobility configuration parameters to the at least one second UE device based on the boundary area identifier.

Some example embodiments provide that the CE network device is one of a RAN intelligent controller network device or an operations administration and maintenance (OAM) network device.

Some example embodiments provide that the RAN node is further caused to perform the first mobility policy update procedure by generating the mapping information based on the historical position information and the network handover information, the generating the mapping information including determining boundaries for the plurality of boundary areas based on handover failure type information associated with each of the plurality of boundary areas included in the network handover information, updating the mobility configuration parameters for each of the plurality of boundary areas, and transmitting the determined mapping information to the LMF network device, and the RAN node is further caused to receive the current location information corresponding to each of the at least one second UE device from the LMF network device, the current location information including a boundary area identifier of a current boundary area corresponding to the current location of the at least one second UE device, and assign the updated mobility configuration parameters to the at least one second UE device based on the boundary area identifier.

Some example embodiments provide that the collected network handover information includes a total number of too-late (TL) handovers and a total number of too-early (TE) handovers occurring at each of the at least one cell pair during a desired time period, and the desired threshold condition includes the total number of TL handovers equaling the total number of TE handovers during the desired time period.

Some example embodiments provide that the updated mobility configuration parameters includes at least one of an updated cell individual offset (CIO) value and an updated time-to-trigger (TTT) value.

Some example embodiments provide that the RAN node is further caused to receive new current location information corresponding to the at least one second UE device traveling between the at least one cell pair from the LMF network device in response to the assigned updated offset value to each at least one second UE device, perform a second mobility policy update procedure in real-time based on the new current location information, the performing the second mobility policy update procedure including, collecting key performance indicator (KPI) information associated with each of the plurality of boundary areas of the mapping information in real-time, determining whether to update the mobility policy associated with each of the plurality of boundary areas based on the collected KPI information and a desired threshold condition, and updating the mobility configuration parameters for the determined boundary areas based on the collected KPI information.

At least one example embodiment is directed towards a network device.

In at least one example embodiment, the network device may include a memory having computer readable instructions stored thereon, and processing circuitry configured to execute the computer readable instructions to cause the network device to, receive historical position information corresponding to a plurality of first UE device from a radio access network (RAN) node, the historical position information including network handover information associated with the plurality of first UE device traveling between at least one cell pair, the at least one cell pair including a cell served by the RAN node and at least one neighboring cell of the RAN node, generate mapping information based on the historical position information and the network handover information, the generating the mapping information including determining boundaries for a plurality of boundary areas associated with the RAN node based on handover failure type information associated with each of the plurality of boundary areas included in the network handover information, determine mobility configuration parameters for each of the plurality of boundary areas, transmit the determined mapping information to a location management function (LMF) network device, and transmit the determined mobility configuration parameters to the RAN node.

Some example embodiments provide that the network device is one of a RAN intelligent controller network device or an operations administration and maintenance (OAM) network device.

Some example embodiments provide that the network handover information includes a total number of too-late (TL) handovers and a total number of too-early (TE) handovers occurring at each of the at least one cell pair during a desired time period.

Some example embodiments provide that the mobility configuration parameters includes at least one of an updated cell individual offset (CIO) value and an updated time-to-trigger (TTT) value.

Some example embodiments provide that, in response to the transmitted mobility configuration parameters, the RAN node is caused to receive current location information of at least one second UE device traveling between the RAN node and the at least one neighboring cell from the LMF network device, the current location information including a boundary area identifier of a current boundary area corresponding to the current location of the at least one second UE device, and assign the mobility configuration parameters to at least one second UE device based on the boundary area identifier.

Some example embodiments provide that the network device is caused to perform the determining the boundaries for the plurality of boundary areas by determining the boundaries for each of the boundary areas of the plurality of boundary areas based on the handover failure type information such that the each boundary area includes a single handover failure type.

At least one example embodiment is directed towards a method of operating a radio access network (RAN) node.

In at least one example embodiment, the method may include collecting network handover information associated with at least one first user equipment (UE) device traveling between at least one cell pair, the at least one cell pair including a cell served by the RAN node and at least one neighboring cell of the RAN node, determining whether to update a mobility policy associated with the RAN node based on the collected network handover information and a desired threshold condition, performing a first mobility policy update procedure for the RAN node based on results of the determination, receiving current location information corresponding to at least one second UE device traveling between the at least one cell pair from a location management function (LMF) network device in response to the performed first mobility policy update procedure, and assigning updated mobility configuration parameters to the at least one second UE device based on the received current location information of the at least one second UE device and mapping information associated with the cell served by the RAN node, the mapping information including a plurality of boundary areas associated with the at least one cell pair.

Some example embodiments provide that the method may further include transmitting positioning service requests for each of the at least one first UE device to the LMF network device, receiving position information corresponding to each of the at least one first UE device from the LMF network device in response to the transmitted positioning service requests, and collecting the received position information as historical position information for the at least one first UE device.

Some example embodiments provide that the performing the first mobility policy update procedure further includes transmitting the historical position information to a centralized entity (CE) network device for each of the at least one first UE device, the historical position information including the network handover information corresponding to the at least one first UE device, and receiving the updated mobility configuration parameters from the CE network device.

Some example embodiments provide that in response to the transmitted positioning information, the CE network device generates the mapping information based on the historical position information and the network handover information, the generating the mapping information including determining boundaries for the plurality of boundary areas based on handover failure type information associated with each of the plurality of boundary areas included in the network handover information, updates the mobility configuration parameters for each of the plurality of boundary areas, transmits the determined mapping information to the LMF network device, and transmits the updated mobility configuration parameters to the RAN node, and the method may further include receiving the current location information corresponding to each of the at least one second UE device from the LMF network device, the current location information including a boundary area identifier of a current boundary area corresponding to the current location of the at least one second UE device, and assigning the updated mobility configuration parameters to the at least one second UE device based on the boundary area identifier.

Some example embodiments provide that the performing the first mobility policy update procedure further includes generating the mapping information based on the historical position information and the network handover information, the generating the mapping information including determining boundaries for the plurality of boundary areas based on handover failure type information associated with each of the plurality of boundary areas included in the network handover information, updating the mobility configuration parameters for each of the plurality of boundary areas, and transmitting the determined mapping information to the LMF network device, and the method may further include receiving the current location information corresponding to each of the at least one second UE device from the LMF network device, the current location information including a boundary area identifier of a current boundary area corresponding to the current location of the at least one second UE device, and assigning the updated mobility configuration parameters to the at least one second UE device based on the boundary area identifier.

At least one example embodiment is directed towards a radio access network (RAN) node.

In at least one example embodiment, the RAN node may include processing means arranged to, collect network handover information associated with at least one first user equipment (UE) device traveling between at least one cell pair, the at least one cell pair including a cell served by the RAN node and at least one neighboring cell of the RAN node, determine whether to update a mobility policy associated with the RAN node based on the collected network handover information and a desired threshold condition, and perform a first mobility policy update procedure for the RAN node based on results of the determination, and transmission means arranged to receive current location information corresponding to at least one second UE device traveling between the at least one cell pair from a location management function (LMF) network device in response to the performed first mobility policy update procedure, and wherein the processing means are further arranged to assign updated mobility configuration parameters to the at least one second UE device based on the received current location information of the at least one second UE device and mapping information associated with the cell served by the RAN node, the mapping information including a plurality of boundary areas associated with the at least one cell pair.

Some example embodiments may provide that the transmission means are further arranged to transmit positioning service requests for each of the at least one first UE device to the LMF network device, and receive position information corresponding to each of the at least one first UE device from the LMF network device in response to the transmitted positioning service requests, and the processing means are further arranged to collect the received position information as historical position information for the at least one first UE device.

Some example embodiments may provide that the transmission means are further arranged to transmit the historical position information to a centralized entity (CE) network device for each of the at least one first UE device, the historical position information including the network handover information corresponding to the at least one first UE device, and receive the updated mobility configuration parameters from the CE network device.

Some example embodiments may provide that the CE network device includes processing means arranged to generate the mapping information based on the historical position information and the network handover information, the generating the mapping information including determining boundaries for the plurality of boundary areas based on handover failure type information associated with each of the plurality of boundary areas included in the network handover information and update the mobility configuration parameters for each of the plurality of boundary areas, in response to the transmitted positioning information, and the CE network device includes transmission means arranged to transmit the determined mapping information to the LMF network device, and transmit the updated mobility configuration parameters to the RAN node, and the transmission means of the RAN node are further arranged to receive the current location information corresponding to each of the at least one second UE device from the LMF network device, the current location information including a boundary area identifier of a current boundary area corresponding to the current location of the at least one second UE device, and the processing means of the RAN node are further arranged to assign the updated mobility configuration parameters to the at least one second UE device based on the boundary area identifier.

Some example embodiments may provide that the CE network device is one of a RAN intelligent controller network device or an operations administration and maintenance (OAM) network device.

Some example embodiments may provide that the processing means are further arranged to generate the mapping information based on the historical position information and the network handover information, the generating the mapping information including determining boundaries for the plurality of boundary areas based on handover failure type information associated with each of the plurality of boundary areas included in the network handover information, and update the mobility configuration parameters for each of the plurality of boundary areas, the transmission means are further arranged to transmit the determined mapping information to the LMF network device, and receive the current location information corresponding to each of the at least one second UE device from the LMF network device, the current location information including a boundary area identifier of a current boundary area corresponding to the current location of the at least one second UE device, and the processing means are further arranged to assign the updated mobility configuration parameters to the at least one second UE device based on the boundary area identifier.

Some example embodiments may provide that the collected network handover information includes a total number of too-late (TL) handovers and a total number of too-early (TE) handovers occurring at each of the at least one cell pair during a desired time period, and the desired threshold condition includes the total number of TL handovers equaling the total number of TE handovers during the desired time period.

Some example embodiments may provide that the updated mobility configuration parameters includes at least one of an updated cell individual offset (CIO) value and an updated time-to-trigger (TTT) value.

Some example embodiments may provide that the transmission means are further arranged to receive new current location information corresponding to the at least one second UE device traveling between the at least one cell pair from the LMF network device in response to the assigned updated offset value to each at least one second UE device, the processing means are further arranged to perform a second mobility policy update procedure in real-time based on the new current location information, the performing the second mobility policy update procedure including, collecting key performance indicator (KPI) information associated with each of the plurality of boundary areas of the mapping information in real-time, determining whether to update the mobility policy associated with each of the plurality of boundary areas based on the collected KPI information and a desired threshold condition, and updating the mobility configuration parameters for the determined boundary areas based on the collected KPI information.

At least one example embodiment is directed towards a network device.

In at least one example embodiment, the network device may include transmission means arranged to receive historical position information corresponding to a plurality of first UE device from a radio access network (RAN) node, the historical position information including network handover information associated with the plurality of first UE device traveling between at least one cell pair, the at least one cell pair including a cell served by the RAN node and at least one neighboring cell of the RAN node, processing means arranged to generate mapping information based on the historical position information and the network handover information, the generating the mapping information including determining boundaries for a plurality of boundary areas associated with the RAN node based on handover failure type information associated with each of the plurality of boundary areas included in the network handover information, and determine mobility configuration parameters for each of the plurality of boundary areas, and wherein the transmission means are further arranged to, transmit the determined mapping information to a location management function (LMF) network device, and transmit the determined mobility configuration parameters to the RAN node.

Some example embodiments may provide that the network device is one of a RAN intelligent controller network device or an operations administration and maintenance (OAM) network device.

Some example embodiments may provide that the network handover information includes a total number of too-late (TL) handovers and a total number of too-early (TE) handovers occurring at each of the at least one cell pair during a desired time period.

Some example embodiments may provide that the mobility configuration parameters includes at least one of an updated cell individual offset (CIO) value and an updated time-to-trigger (TTT) value.

Some example embodiments may provide that the transmission means are further arranged to receive current location information of at least one second UE device traveling between the RAN node and the at least one neighboring cell from the LMF network device, the current location information including a boundary area identifier of a current boundary area corresponding to the current location of the at least one second UE device, in response to the transmitted mobility configuration parameters, and the processing means are further arranged to assign the mobility configuration parameters to at least one second UE device based on the boundary area identifier.

Some example embodiments may provide that the processing means are further arranged to determine the boundaries for each of the boundary areas of the plurality of boundary areas based on the handover failure type information such that the each boundary area includes a single handover failure type.

BRIEF DESCRIPTION OF THE DRAWINGS

The accompanying drawings, which are incorporated in and constitute a part of the specification, illustrate one or more example embodiments and, together with the description, explain these example embodiments. In the drawings:

FIG. 7 illustrates an example mobility configuration parameter table according to at least one example embodiment.

DETAILED DESCRIPTION

Figure 1A:
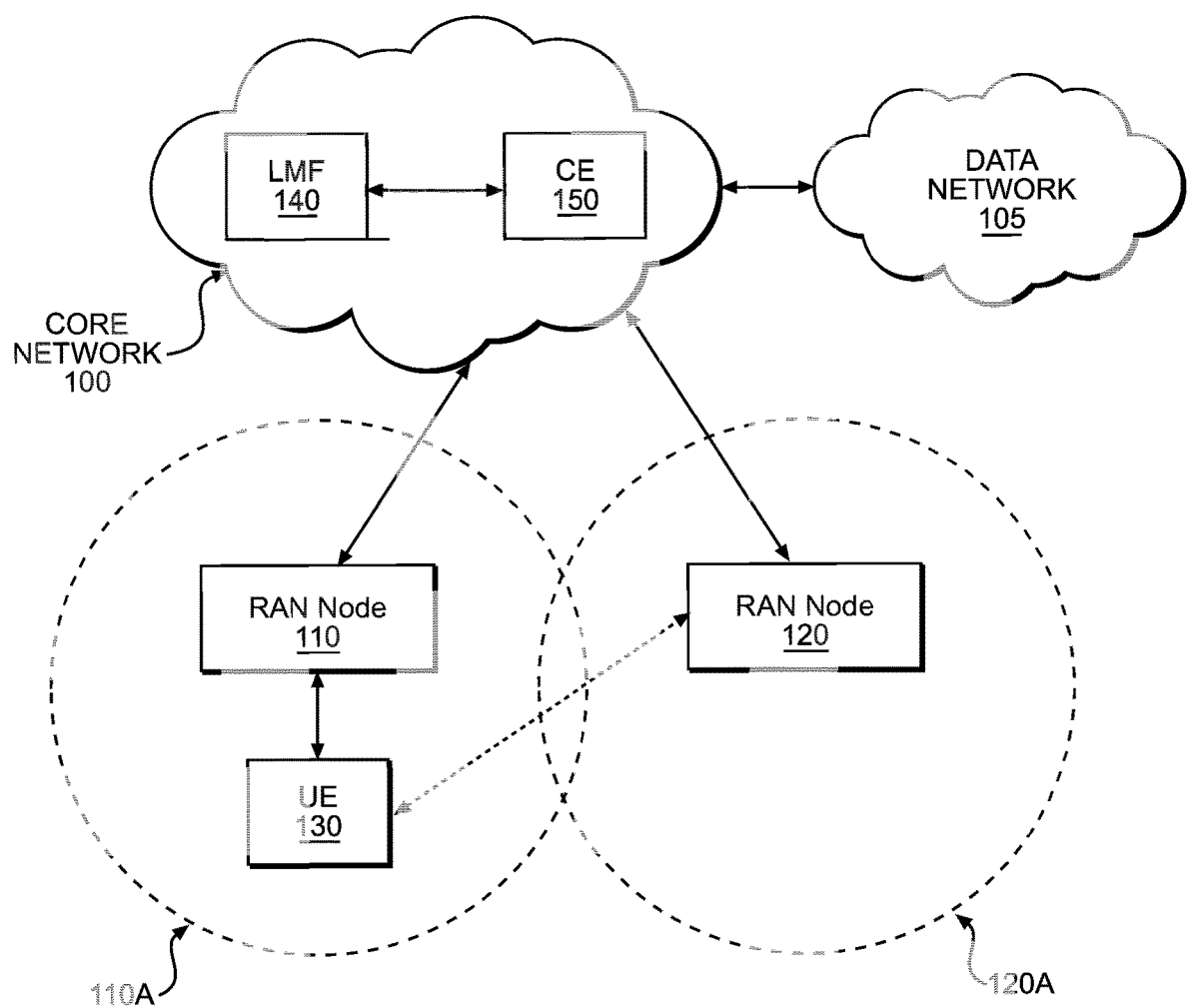
FIG. 1A illustrates a wireless communication system according to at least one example embodiment.

Various example embodiments will now be described more fully with reference to the accompanying drawings in which some example embodiments are shown.

Detailed example embodiments are disclosed herein. However, specific structural and functional details disclosed herein are merely representative for purposes of describing the example embodiments. The example embodiments may, however, may be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the example embodiments. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of the example embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of the example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware circuitry and/or software, firmware, middleware, microcode, hardware description languages, etc., in combination with hardware (e.g., software executed by hardware, etc.). When implemented in software, firmware, middleware or microcode, the program code or code segments to perform the desired tasks may be stored in a machine or computer readable medium such as a non-transitory computer storage medium, and loaded onto one or more processors to perform the desired tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used in this application, the term "circuitry" and/or "hardware circuitry" may refer to one or more or all of the following: (a) hardware-only circuit implementation (such as implementations in only analog and/or digital circuitry); (b) combinations of hardware circuits and software, such as (as applicable): (i) a combination of analog and/or digital hardware circuit(s) with software/firmware, and (ii) any portions of hardware processor(s) with software (including digital signal processor(s)), software, and memory(ies) that work together to cause an apparatus, such as a mobile phone or server, to perform various functions); and (c) hardware circuit(s) and/or processor(s), such as microprocessor(s) or a portion of a microprocessor(s), that requires software (e.g., firmware) for operation, but the software may not be present when it is not needed for operation. For example, the circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

While the various example embodiments of the present disclosure are discussed in connection with a fixed (e.g., wired network) for the sake of clarity and convenience, the example embodiments are not limited thereto, and one of ordinary skill in the art would recognize the example embodiments may be equally applicable to wireless communication standards, such as the 5G standard, 4G standard, a Wi-Fi standard, a future 6G standard, a future 7G standard, etc.

One or more example embodiments are directed towards methods, apparatuses, systems, and/or non-transitory computer readable media for providing location management function (LMF) assisted mobility robustness optimization (MRO) for user equipment (UE) devices traveling between network cells. MRO refers to methods of providing cell-pair, e.g., a source cell and a target cell pair, or in other words, a first cell that a UE is currently connected and a second cell that the UE will be handed over to, specific mobility parameters to be applied by desired RAN nodes to address mobility issues (e.g., handover issues) experienced by UE devices crossing specific cell-pairs. For example, if it is observed UE devices served by RAN node A predominately experience TL handover failures (e.g., the handover process occurred too late, resulting in the drop of the UE device's wireless connection, etc.) at the border of the cell of RAN node A and the cell of neighboring RAN node B, the core network may assign a mobility parameter offset to UE devices in the boundary area of the A-B cell-pair which causes RAN node A to trigger a handover at an earlier point in time in an attempt to address the TL handover failures.

However, existing MRO solutions can only assign a single cell-pair specific mobility parameter to a specific cell-pair boundary. Thus, when the boundary area of a specific cell-pair does not solely, or predominately, experience handover failures of a single failure type (e.g., TL handover failures, TE handover failures, ping-pong handover failures, etc.), the existing MRO solutions may be ineffective and/or may exacerbate handover failures. Referring again to the previous example, if a first subset of UE devices at the A-B cell-pair experience TL handover failures, and a second subset of UE devices at the A-B cell-pair experience TE handover failures, the second subset of UE devices may experience increased handover failures due to the assignment of mobility parameters offset values to address the TL handover failures, or a third subset of UE devices may newly experience handover failures due to the assignment of the mobility parameter offset, etc.

Therefore, one or more of the example embodiments reduce the amount of handover failures experienced at cell-pair boundaries by using LMF assistance from the wireless network to determine historical and/or real-time location-based network statistics to sub-divide border and/or boundary regions between specific cell-pairs and provide MRO improvements and/or optimizations on a more granular geographical level.

Figure 1B:
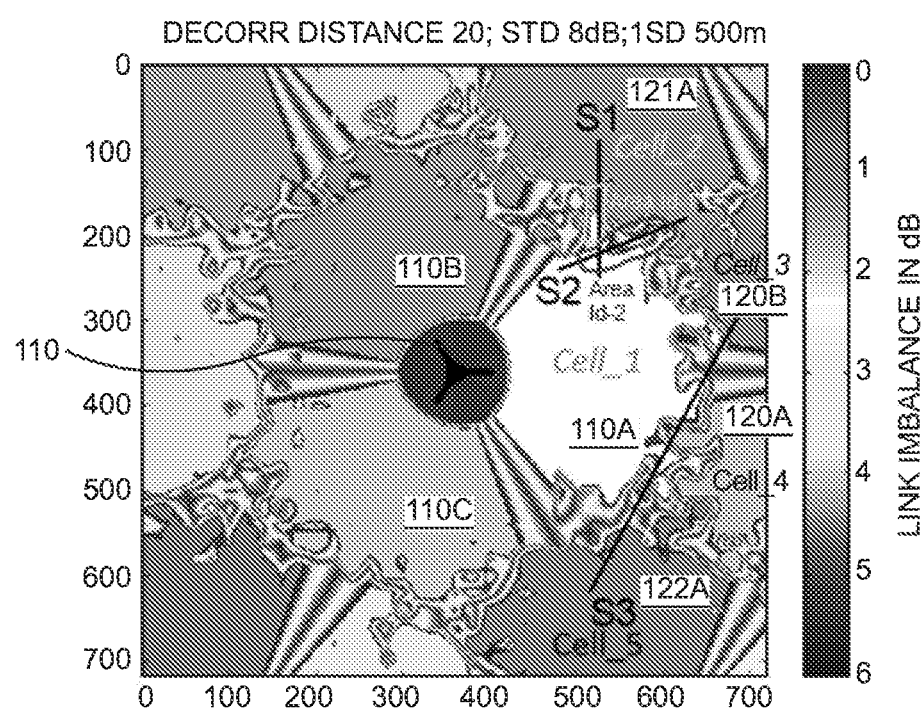
FIG. 1B is a diagram illustrating example cell boundaries according to at least one example embodiment

FIGS. 1A and 1B illustrate a wireless communication system according to at least one example embodiment. More specifically, FIG. 1A illustrates a block diagram of an example wireless communication system according to at least one example embodiment, and FIG. 1B is a diagram illustrating example cell boundaries according to at least one example embodiment.

As shown in FIG. 1A, a wireless communication system includes a core network 100, a Data Network 105, a first radio access network (RAN) node 110, a second user equipment (UE) device 120, and a UE device 130, but the example embodiments are not limited thereto and the example embodiments may include a greater or lesser number of constituent elements. For example, the wireless communication system may include a plurality of UE devices, three or more RAN nodes, etc.

The RAN nodes 110 and 120 and/or the UE device 130 may be connected over a wireless network, such as a cellular wireless access network (e.g., a 3G wireless access network, a 4G-Long Term Evolution (LTE) network, a 5G-New Radio (e.g., 5G) wireless network, a WiFi network, etc.). The wireless network may include a core network 100 and/or a Data Network 105. The RAN nodes 110 and 120 may communicate with each other and/or other RAN nodes (not shown), as well as to the core network 100 and/or the Data Network 105, over a wired and/or wireless network. The core network 100 and the Data Network 105 may connect to each other over a wired and/or wireless network. The Data Network 105 may refer to the Internet, an intranet, a wide area network, etc.

The UE device 130 may be any one of, but not limited to, a mobile device, a smartphone, a tablet, a laptop computer, a wearable device, an Internet of Things (IoT) device, a sensor (e.g., thermometers, humidity sensors, pressure sensors, motion sensors, accelerometers, etc.), actuators, robotic devices, robotics, drones, connected medical devices, eHealth devices, smart city related devices, a security camera, autonomous devices (e.g., autonomous cars, etc.), a desktop computer and/or any other type of stationary or portable device capable of operating according to, for example, the 5G NR communication standard, and/or other wireless communication standard(s).

The wireless communication system further includes at least one RAN node (e.g., a base station, a wireless access point, etc.), such as RAN nodes 110 and 120, etc. The RAN nodes 110 and 120 may operate according to an underlying cellular and/or wireless radio access technology (RAT), such as 5G NR, LTE, Wi-Fi, etc. For example, the RAN nodes 110 and/or 120 may be a 5G gNB node, a 5G eNB node, or a LTE ng-eNB node, etc., but the example embodiments are not limited thereto. The RAN nodes 110 and 120 may each provide wireless network services to one or more UE devices within at least one cell service area (e.g., a cell, a broadcast area, a serving area, a coverage area, etc.) surrounding the respective physical location of the RAN node, such as a cell service area 110A surrounding the RAN node 110, and a cell service area 120A surrounding the RAN node 120, etc. For example, UE device 130 is located within the cell service area 110A, and may connect to, receive broadcast messages from, receive paging messages from, receive/transmit signaling messages from/to, and/or access the wireless network through, etc., RAN node 110 (e.g., the RAN node serving the UE device 130), but the example embodiments are not limited thereto. There may also be overlap between two or more cell service areas, such as the overlap region between regions 110A and 120A of FIG. 1, and UE devices located within the overlap region, may connect to either RAN node 110 and RAN node 120, may access RAN node 110 and RAN node 120 simultaneously, etc. Moreover, one or more UE devices may travel from one cell servicing area to another cell servicing area as well.

For the sake of clarity, FIG. 1A illustrates RAN nodes 110 and 120 each providing a single cell service area (e.g., cell service areas 110A and 120A, respectively). However, the example embodiments are not limited thereto, and for example, as shown in FIG. 1B, RAN nodes, such as RAN node 110, etc., may provide a plurality of cell service areas 110A, 110B, 110C, etc. Additionally, as shown in FIG. 1B, the boundaries of the cell service areas, such as cells 110A and 120A, etc., may not be circular, static, and/or homogenous radio signal strength, but instead may be irregularly shaped, dynamic, and/or heterogeneous radio signal strength due to geographical, environmental, and/or other external factors, thereby impacting UE handover conditions at these border areas (e.g., boundary areas, etc.) between cells. For example, changes in elevation of the landscape, existence of buildings, trees, etc., external electrical-magnetic (EM) interference from external radio sources, the Sun, etc., may cause cell boundaries to be irregularly shaped and/or differences in radio signal strengths in different areas of the cell, etc. Moreover, as shown in FIG. 1B, streets, such as streets S1, S2, and/or S3, etc., may intersect a single cell-pair boundary at multiple locations, and/or may intersect multiple cell-pair boundaries, but the example embodiments are not limited thereto. Additionally, UEs traveling on one or more streets (and/or pathways, etc.) may travel at different speeds and/or velocities, for example, due to different speed limits assigned to the individual streets, real-time traffic congestion levels of the streets, etc., which may also impact UE handover conditions at the border areas (e.g., boundary areas, etc.) between cells.

The RAN nodes 110 and/or 120 may be connected to at least one core network element residing on the core network 100, such as a core network device, a core network server, access points, switches, routers, nodes, etc., but the example embodiments are not limited thereto. For example, the core network 100 may provide core network functions, such as location management function (LMF) 140, a centralized entity (CE) 150, etc., but the example embodiments are not limited thereto. For example, the core network 100 may provide additional network functions, such as an access and mobility management function (AMF), a session management function (SMF), a policy control function (PCF), a unified data management (UDM), a user plane function (UPF), an authentication server function (AUSF), an application function (AF), and/or a network slice selection function (NSSF), etc., but the example embodiments are not limited thereto.

According to at least one example embodiment, the LMF 140 may be configured to provide location (e.g., position, etc.) determination functions regarding individual UE devices, such as UE 130, etc., to other network devices, such as RAN node 110 and/or 120, CE 150, etc. The LMF 140 may determine the current location of one or more UEs connected to the network based on downlink location measurements, location estimates provided by the UE itself, uplink location measurements provided by a serving RAN node (e.g., RAN nodes 110 and/or 120, etc.), and/or hybrid location estimates (e.g., UE-assisted location estimates) based on a combination of UE provided location information and RAN node provided location information, etc., but the example embodiments are not limited thereto.

According to at least one example embodiment, the CE 150 may be at least one network device and/or function, such as a RAN intelligent controller (RIC) and/or an operations administration and maintenance (OAM) function, etc., but the example embodiments are not limited thereto. According to some example embodiments, OAM provides implementation of fault, configuration, accounting, performance, and security (FCAPS) functions (e.g., network error reporting/handling, etc.), file management, and/or software management functions for network functions, network elements, etc., but is not limited thereto. According to some example embodiments, a RIC provides various RAN management, operation, and optimization services, for one or more RAN nodes residing on the wireless network, such as like radio connection management, mobility management, quality of service (QoS) management, interference management, radio resource management, etc., but the example embodiments are not limited thereto. According to at least one example embodiment, when implemented as either the OAM and/or the RIC, the CE 150 may communicate with one or more RAN nodes, such as 120 and 130, etc., and manage various MRO related settings and/or operations, etc., but the example embodiments are not limited thereto. The LMF 140 and the CE 150 will be discussed in further detail in connection with FIGS. 4 to 6.

Each of the network elements of the core network 100 and/or data network 105, including LMF 140, CE 150, etc., may be embodied as a server, a processing device, a node, a router, a network device, etc. Additionally, one or more of the core network elements may be combined into one or more servers, processing devices, nodes, routers, network devices, etc. For example, the LMF 140 and the CE 150, etc., may be incorporated into a single core network server, etc.

While certain components of a wireless communication network are shown as part of the wireless communication system of FIGS. 1A and 1B, the example embodiments are not limited thereto, and the wireless communication network may include components other than that shown in FIG. 1A, which are desired, necessary, and/or beneficial for operation of the underlying networks within the wireless communication system, such as access points, switches, routers, nodes, servers, gateways, etc.

Figure 2:
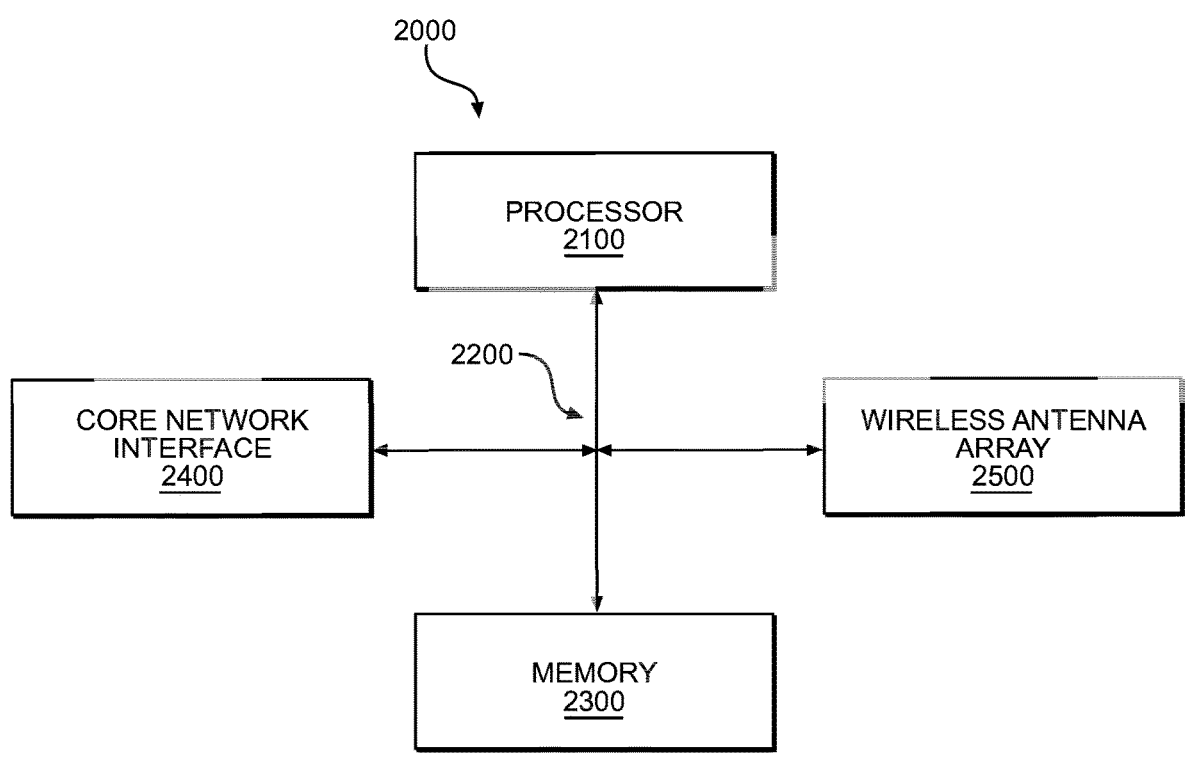
FIG. 2 illustrates a block diagram of an example RAN node according to at least one example embodiment.

FIG. 2 illustrates a block diagram of an example RAN node according to at least one example embodiment. The RAN node may be the first RAN node 110 and/or the second RAN node 120 of FIG. 1, but is not limited thereto.

Referring to FIG. 2, a RAN node 2000 may include processing circuitry, such as at least one processor 2100, at least one communication bus 2200, a memory 2300, at least one core network interface 2400, and/or at least one wireless antenna array 2500, but the example embodiments are not limited thereto. For example, the core network interface 2400 and the wireless antenna array 2500 may be combined into a single network interface, etc., or the RAN node 2000 may include a plurality of wireless antenna arrays, a plurality of core network interfaces, etc., and/or combinations thereof. The memory 2300 may include various special purpose program code including computer executable instructions which may cause the RAN node 2000 to perform one or more of the methods of the example embodiments.

In at least one example embodiment, the processing circuitry may include at least one processor (and/or processor cores, distributed processors, networked processors, etc.), such as the at least one processor 2100, which may be configured to control one or more elements of the RAN node 2000, and thereby cause the RAN node 2000 to perform various operations. The processing circuitry (e.g., the at least one processor 2100, etc.) is configured to execute processes by retrieving program code (e.g., computer readable instructions) and data from the memory 2300 to process them, thereby executing special purpose control and functions of the entire RAN node 2000. Once the special purpose program instructions are loaded into, e.g., the at least one processor 2100, etc., the at least one processor 2100 executes the special purpose program instructions, thereby transforming the at least one processor 2100 into a special purpose processor.

In at least one example embodiment, the memory 2300 may be a non-transitory computer-readable storage medium and may include a random access memory (RAM), a read only memory (ROM), and/or a permanent mass storage device such as a disk drive, or a solid state drive. Stored in the memory 2300 is program code (i.e., computer readable instructions) related to operating the RAN node 2000, such as the methods discussed in connection with FIGS. 5 and/or 6, the at least one core network interface 2400, and/or the at least one wireless antenna array 2500, etc. Such software elements may be loaded from a non-transitory computer-readable storage medium independent of the memory 2300, using a drive mechanism (not shown) connected to the RAN node 2000, or via the at least one core network interface 2400, and/or at least one wireless antenna array 2500, etc.

In at least one example embodiment, the communication bus 2200 may enable communication and data transmission to be performed between elements of the RAN node 2000. The bus 2200 may be implemented using a high-speed serial bus, a parallel bus, and/or any other appropriate communication technology. According to at least one example embodiment, the RAN node 2000 may include a plurality of communication buses (not shown), such as an address bus, a data bus, etc.

The RAN node 2000 may operate as, for example, a 4G RAN node, a 5G RAN node, etc., and may be configured to schedule resource blocks (e.g., physical resource blocks (PRBs), resource elements, etc.) for UE devices connected to the RAN node 2000.

For example, the RAN node 2000 may allocate time-frequency resources of a carrier (e.g., resource blocks with time and frequency dimensions) based on operation on the time domain (e.g., time division duplexing) and the frequency domain (e.g., frequency division duplexing). In the time domain context, the RAN node 2000 will allocate a carrier (or subbands of the carrier) to one or more UEs (e.g., UE 130, etc.) connected to the RAN node 2000 during designated upload (e.g., uplink (UL)) time periods and designated download (e.g., downlink (DL)) time periods. When there are multiple UEs connected to the RAN node 2000, the carrier is shared in time such that each UE is scheduled by the RAN node 2000, and the RAN node 2000 allocates each UE with their own uplink time and/or downlink time. In the frequency domain context and/or when performing spatial domain multiplexing of UEs (e.g., MU MIMO, etc.), the RAN node 2000 will allocate separate frequency subbands of the carrier to UEs simultaneously served by the RAN node 2000, for uplink and/or downlink transmissions. Data transmission between the UE and the RAN node 2000 may occur on a radio frame basis in both the time domain and frequency domain contexts. The minimum resource unit for allocation and/or assignment by the RAN node 2000 to a particular UE device corresponds to a specific downlink/uplink time slot (e.g., one OFDM symbol, one slot, one minislot, one subframe, etc.) and/or a specific downlink/uplink resource block (e.g., twelve adjacent subcarriers, a frequency subband, etc.).

The RAN node 2000 may also include at least one core network interface 2400, and/or at least one wireless antenna array 2500, etc. The at least one wireless antenna array 2500 may include an associated array of radio units (not shown) and may be used to transmit the wireless signals in accordance with a radio access technology, such as 4G LTE wireless signals, 5G NR wireless signals, etc., to at least one UE device, such as UE 130, etc. According to some example embodiments, the wireless antenna array 2500 may be a single antenna, or may be a plurality of antennas, etc. For example, the wireless antenna array 2500 may be configured as a grid of beams (GoB) which transmits a plurality of beams in different directions, angles, frequencies, such as frequency range 1 (FR1) and/or frequency range 2 (FR2) assigned to the 5G protocol, and/or with different delays, etc., but the example embodiments are not limited thereto.

The RAN node 2000 may communicate with a core network 100 (e.g., backend network, backhaul network, backbone network, etc.) and/or a Data Network 105, of the wireless communication network via a core network interface 2400. The core network interface 2400 may be a wired and/or wireless network interface and may enable the RAN node 2000 to communicate and/or transmit data to and from to network devices on the backend network, such as LMF 140, CE 150, etc., a core network gateway (not shown), a Data Network (e.g., Data Network 105), such as the Internet, intranets, wide area networks, telephone networks, VoIP networks, etc.

While FIG. 2 depicts an example embodiment of a RAN node 2000, the RAN node is not limited thereto, and may include additional and/or alternative architectures that may be suitable for the purposes demonstrated.

Figure 3:
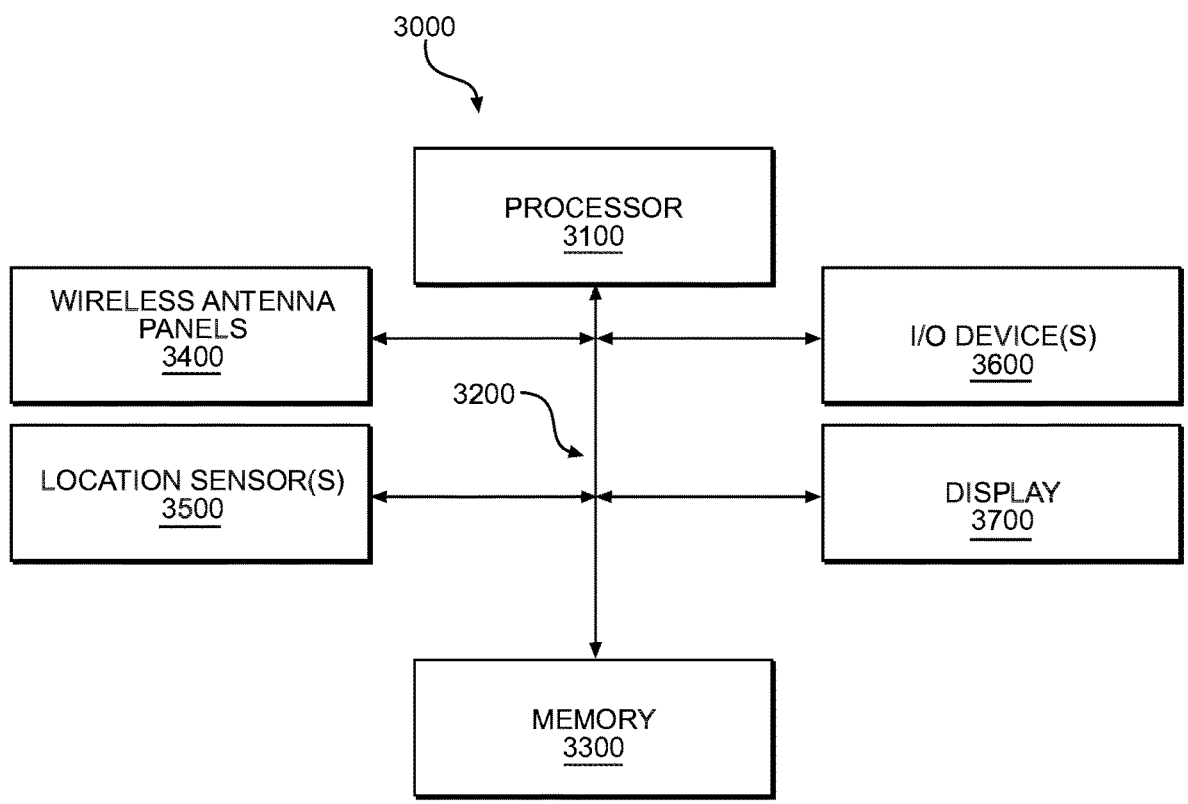
FIG. 3 illustrates a block diagram of an example UE device according to at least one example embodiment.

FIG. 3 illustrates a block diagram of an example UE device according to at least one example embodiment. The example UE device of FIG. 3 may correspond to the UE device 130 of FIG. 1A, but the example embodiments are not limited thereto.

Referring to FIG. 3, a UE 3000 may include processing circuitry, such as at least one processor 3100, at least one communication bus 3200, a memory 3300, a plurality of wireless antennas and/or wireless antenna panels 3400, at least one location sensor 3500, at least one input/output (I/O) device 3600 (e.g., a keyboard, a touchscreen, a mouse, a microphone, a camera, a speaker, etc.), and/or a display panel 3700 (e.g., a monitor, a touchscreen, etc.), but the example embodiments are not limited thereto. According to some example embodiments, the UE 3000 may include a greater or lesser number of constituent components, and for example, the UE 3000 may also include a battery, one or more additional sensors (e.g., thermometers, humidity sensors, pressure sensors, motion sensors, accelerometers, etc.), actuators, a single wireless antenna and/or a single wireless antenna panel, etc. Additionally, the location sensor 3500, the display panel 3700, and/or I/O device 3600, etc., of UE 3000 may be optional.

In at least one example embodiment, the processing circuitry may include at least one processor (and/or processor cores, distributed processors, networked processors, etc.), such as the at least one processor 3100, which may be configured to control one or more elements of the UE 3000, and thereby cause the UE 3000 to perform various operations. The processing circuitry (e.g., the at least one processor 3100, etc.) is configured to execute processes by retrieving program code (e.g., computer readable instructions) and data from the memory 3300 to process them, thereby executing special purpose control and functions of the entire UE 3000. Once the special purpose program instructions are loaded into the processing circuitry (e.g., the at least one processor 3100, etc.), the at least one processor 3100 executes the special purpose program instructions, thereby transforming the at least one processor 3100 into a special purpose processor.

In at least one example embodiment, the memory 3300 may be a non-transitory computer-readable storage medium and may include a random access memory (RAM), a read only memory (ROM), and/or a permanent mass storage device such as a disk drive, or a solid state drive. Stored in the memory 3300 is program code (i.e., computer readable instructions) related to operating the UE 3000, such as the methods discussed in connection with FIGS. 5 to 6, the wireless antenna 3400, and/or the location sensor 3500, etc. Such software elements may be loaded from a non-transitory computer-readable storage medium independent of the memory 3300, using a drive mechanism (not shown) connected to the UE 3000, or via the wireless antenna 3400, etc. Additionally, the memory 3300 may store network configuration information, such as system information, etc., for communicating with at least on RAN node, e.g., RAN nodes 110 and/or 120, etc., accessing a wireless network, etc., but the example embodiments are not limited thereto.

For example, according to at least one example embodiment, the UE 3000 may collect (e.g., measure, determine, etc.) current location information using the location sensor 3500 and/or signal quality information with regards to the signal(s) transmitted by a serving RAN node, e.g., RAN node 110, and/or at least one neighboring RAN node, e.g., RAN node 120, etc. For example, the UE 3000 may determine key performance indicator (KPI) statistics indicating the probability of desired failure types, such as RLF due to handover failures, etc., downlink (e.g., UE-side) network condition information, and/or other mobility feedback information. Additionally, the UE 3000 may report the KPI statistics, RLFs, downlink network condition information, and/or mobility feedback information to the RAN node 110 and/or the core network 100, but is not limited thereto.

In at least one example embodiment, the at least one communication bus 3200 may enable communication and data transmission to be performed between elements of the UE 3000. The bus 3200 may be implemented using a high-speed serial bus, a parallel bus, and/or any other appropriate communication technology. According to at least one example embodiment, the UE 3000 may include a plurality of communication buses (not shown), such as an address bus, a data bus, etc.

The UE 3000 may also include a plurality of wireless antenna panels 3400 (e.g., a plurality of wireless antennas, etc.). The plurality of wireless antenna panels 3400 may include a plurality of associated radio units (not shown) and may be used to transmit wireless signals in accordance with at least one desired radio access technology, such as 4G LTE, 5G NR, Wi-Fi, etc. The plurality of wireless antenna panels 3400 may be located at the same or different physical locations on the body of the UE 3000, may have the same or different orientations, may operate in the same or different frequency ranges, may operate in accordance with the same or different radio access technology, etc. According to some example embodiments, the plurality of wireless antenna panels 3400 may be a single antenna, etc.

The UE 3000 may also include at least one location sensor 3500 to calculate the absolute and/or relative location of the UE 3000. The at least one location sensor 3500 may be a GNSS sensor, such as a GPS sensor, a GLONASS sensor, a Galileo sensor, a Beidou sensor, etc., an inertial movement sensors, such as a gyroscope, an accelerometer, an altimeter, etc. Additionally, the location sensor 3500 and/or the processor 3100 may also receive and/or transmit its own location information from and/or to cellular network based positioning services, such as a cellular network location service (e.g., the LMF 140 of the core network, etc.).

While FIG. 3 depicts an example embodiment of a UE 3000, the UE device is not limited thereto, and may include additional and/or alternative architectures that may be suitable for the purposes demonstrated.

Figure 4:
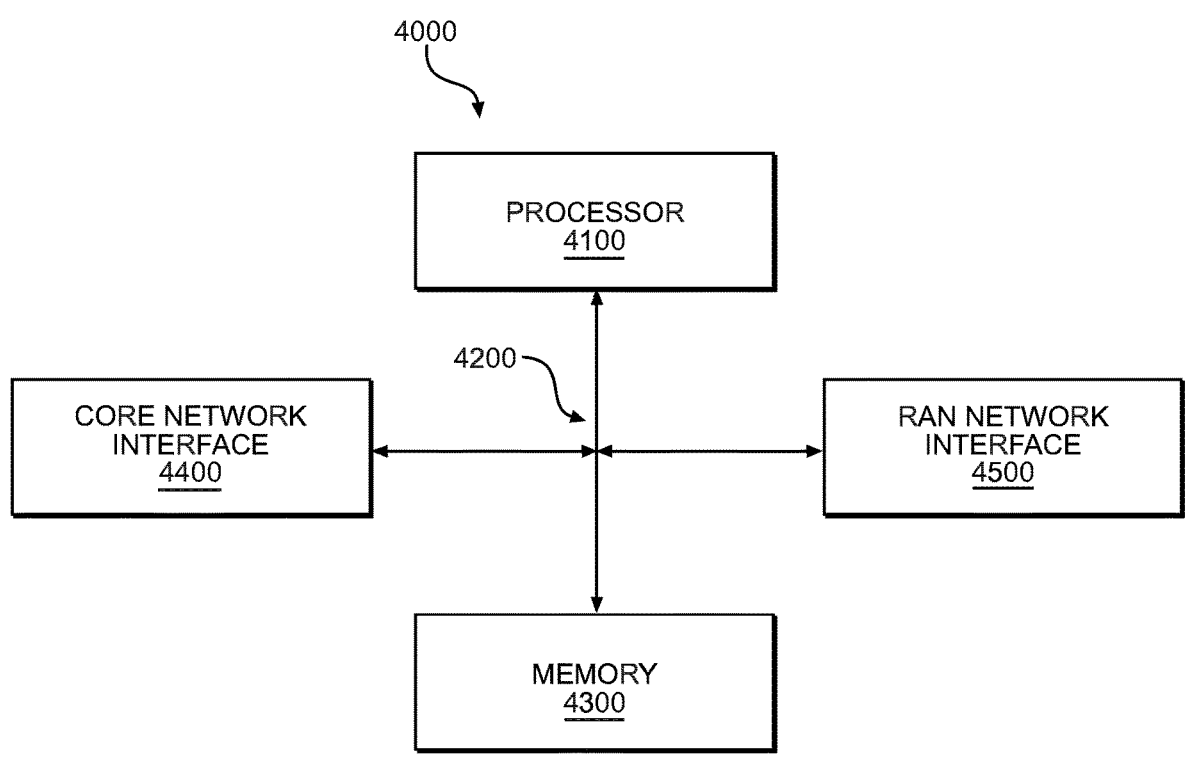
FIG. 4 illustrates a block diagram of an example network device according to at least one example embodiment.

FIG. 4 illustrates a block diagram of an example core network device according to at least one example embodiment. The core network device may be a network function (NF) device, such as LMF 140, CE 150, a RIC, a OAM, etc., of FIG. 1A, but the example embodiments are not limited thereto.

Referring to FIG. 4, a core network device 4000 (e.g., a network device, a network element, a network server, etc.) may include processing circuitry, such as the at least one processor 4100, a communication bus 4200, a memory 4300, at least one core network interface 4400, and/or at least one radio access network (RAN) network interface 4500, but the example embodiments are not limited thereto. For example, the core network interface 4400 and the RAN network interface 4500 may be combined into a single network interface, etc. The memory 4300 may include various program code including computer executable instructions.

In at least one example embodiment, the processing circuitry may include at least one processor (and/or processor cores, distributed processors, networked processors, etc.), such as the at least one processor 4100, which may be configured to control one or more elements of the core network device 4000, and thereby cause the core network device 4000 to perform various operations. The processing circuitry (e.g., the at least one processor 4100, etc.) is configured to execute processes by retrieving program code (e.g., computer readable instructions) and data from the memory 4300 to process them, thereby executing special purpose control and functions of the entire core network device 4000. Once the special purpose program instructions are loaded into, (e.g., the at least one processor 4100, etc.), the at least one processor 4100 executes the special purpose program instructions, thereby transforming the at least one processor 4100 into a special purpose processor.

In at least one example embodiment, the memory 4300 may be a non-transitory computer-readable storage medium and may include a random access memory (RAM), a read only memory (ROM), and/or a permanent mass storage device such as a disk drive, or a solid state drive. Stored in the memory 4300 is program code (i.e., computer readable instructions) related to operating the core network device 4000, such as the methods discussed in connection with FIGS. 5 to 6, the at least one core network interface 4400, and/or at least one RAN network interface 4500, etc. Such software elements may be loaded from a non-transitory computer-readable storage medium independent of the memory 4300, using a drive mechanism (not shown) connected to the core network device 4000, or via the at least one core network interface 4400, and/or at least one RAN network interface 4500, etc.

In at least one example embodiment, the communication bus 4200 may enable communication and data transmission to be performed between elements of the core network device 4000. The bus 4200 may be implemented using a high-speed serial bus, a parallel bus, and/or any other appropriate communication technology.

The core network device 4000 may also include at least one core network interface 4400, and/or at least one RAN network interface 4500, etc. The at least one RAN network interface 4500 may include an associated radio unit (not shown) and may be used to transmit the wireless signals in accordance with a wireless communication protocol, such as 4G LTE wireless signals, 5G NR wireless signals, 6G wireless signals, 7G wireless signals, etc., to at least one RAN node, such as RAN nodes 110 and 120, and/or to at least one UE device, such as UE 130, etc. According to some example embodiments, the RAN network interface 4500 may be a single antenna, or may be a plurality of antennas, etc. In at least one example embodiment, the RAN network interface 4500 may also include a wired network interface.

The core network device 4000 may communicate with a core network 100 (e.g., backend network, backbone network, etc.) and/or Data Network 105 of the wireless communication network via a core network interface 4400. The core network interface 4400 may be a wired and/or wireless network interface and may enable the core network device 4000 to communicate and/or transmit data to and from to network devices on the backend network, such as a core network gateway (not shown), a Data Network gateway (not shown), etc.

While FIG. 4 depicts an example embodiment of a core network device 4000, the core network device is not limited thereto, and may include additional and/or alternative architectures that may be suitable for the purposes demonstrated.

Figure 5:
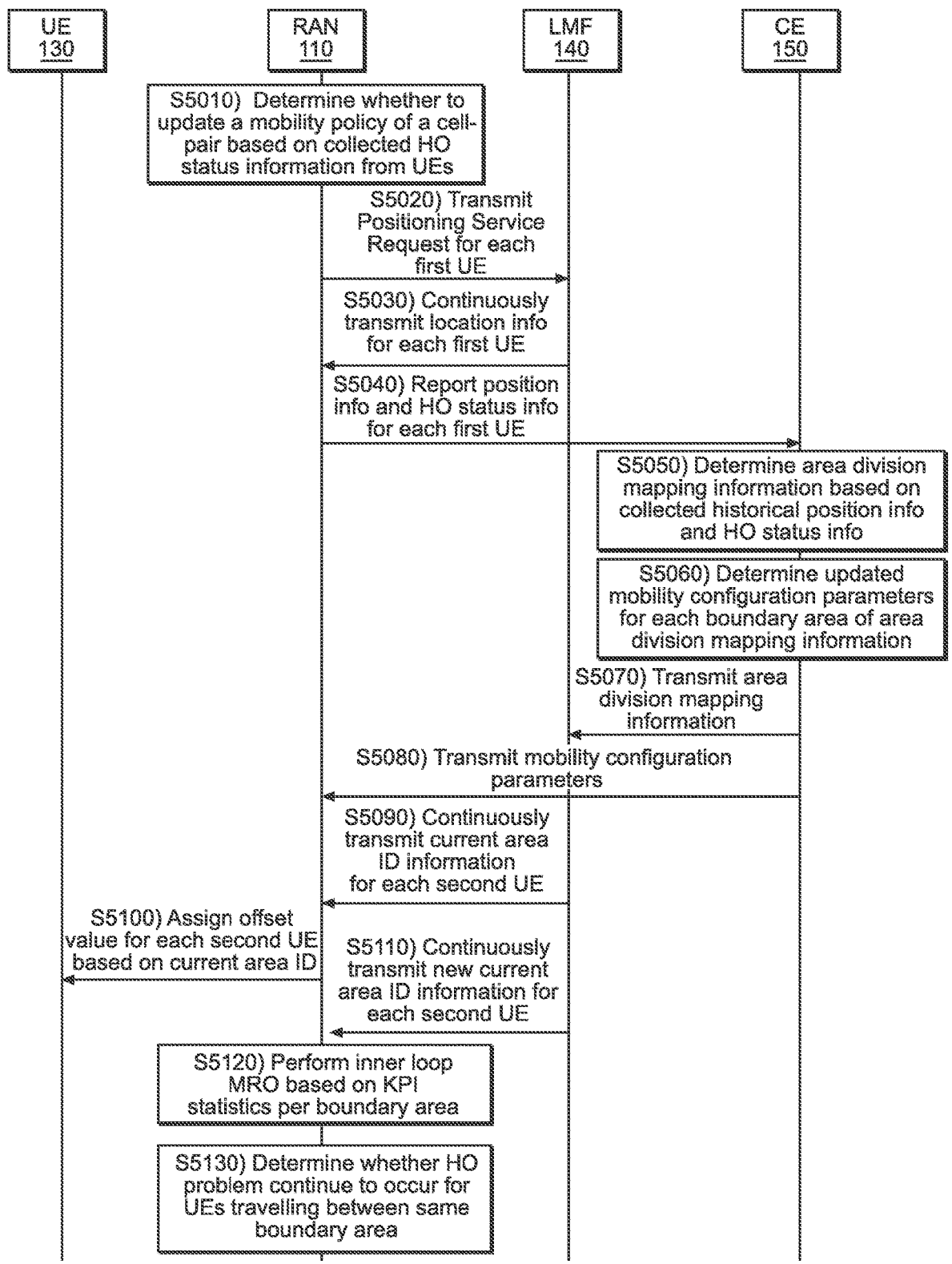
FIG. 5 illustrates a first example transmission flow diagram according to at least one example embodiment.

FIG. 5 illustrates a first example transmission flow diagram according to at least one example embodiment. More specifically, FIG. 5 illustrates a MRO method for reducing and/or optimizing handover (HO) failures and/or other radio link failures (RLF) experienced by UE devices in border regions corresponding to cell-pairs. While some example embodiments are discussed in the context of a UE travelling between two or more cells, the example embodiments are not limited thereto, and for example, the example embodiments may be applied to a UE that is temporarily or permanently stationary, but located in a position wherein the UE may connect to two or more cells (e.g., the UE is in range of two or more RAN nodes, the UE is in range of a stationary RAN node and a mobile RAN node (e.g., a satellite-based RAN node, a vehicle-based RAN node, etc.), etc.).

According to some example embodiments, in operation S5010, a RAN node, such as RAN node 110, RAN node 120, etc., but not limited thereto, may receive network condition information, such as RLF reports, HO success reports, HO failure reports, etc., (collectively referred to hereinafter as HO status information) from UE devices connected to (and/or served by the RAN node 110) indicating that a HO failure has occurred. The HO status information may further include information related to the type of HO failure that occurred, e.g., TL HO failure, TE HO failure, ping-pong HO failure, wrong cell HO failure, etc., a UE identifier, UE device type information, a source cell identifier identifying the cell that the UE was originally being served by, a target cell identifier identifying the cell that the UE attempted to connect to (e.g., the cell that the source RAN node attempted to handover the UE's connection to), etc., but the example embodiments are not limited thereto. Additionally, according to some example embodiments, the HO status information may further include the UE's location information at the time of the HO success or failure, velocity information indicating the velocity of the UE at the time of the HO success or failure, etc. The RAN node 110 may then collect the HO status information from the one or more UE devices connected to the RAN node over a desired time period, and then determine whether to update a mobility policy of a particular cell-pair (e.g., determine whether a HO problem exists at the particular cell-pair, etc.) including the cell served by the RAN node 110 and any cell-pairs associated with the RAN node 110, e.g., same cell-pairs involving the cell served by the RAN node 110 and any of the neighboring cells of the neighboring RAN nodes, such as RAN node 120, etc. The RAN node 110 may determine that the mobility policy needs to be updated based on the collected HO status information and a desired threshold condition (e.g., a desired MRO entry condition, etc.).

Referring now to FIG. 1B, for example, the RAN node 110 may determine the mobility policy needs to be updated based on the total number of reported HO failures exceeds a desired threshold condition (e.g., desired MRO entry condition) for one or more particular cell-pairs, such as between a first same cell-pair cell_1 (110A) and cell_2 (121A); a second same cell-pair cell_1 (110A) and cell_3 (120B); a third same cell-pair cell_1 (110A) and cell_4 (120A), and/or a fourth same cell-pair cell_1 (110A) and cell_5 (122A), etc.

As a second example, the RAN node 110 may determine a HO problem exists at a cell-pair when the number of a single type of observed HO failures exceeds a HO failure type desired threshold condition over the desired time period for a particular same cell-pair, such as the number of TL failures observed exceeding the TL failure type desired threshold value, the number of TE failures observed exceeding the TE failure type desired threshold value, etc.

Additionally, according to some example embodiments, the RAN node 110 may determine a HO problem exists when the number of observed HO failures of a first type is equal to the number of observed HO failures of a second type over a desired time period for a particular same cell-pair. For example, the RAN node 110 may determine that the mobility policy should be updated when the number of TL HO failures equals the number of TE HO failures observed at the (cell_1 and cell 2) cell-pair, etc.

According to some example embodiments, the RAN node 110 may determine a HO problem exists when the number of observed HO failures of a first type is within a desired threshold ratio (e.g., wherein the number of TL failures is within a range of +/−20% of the number of TE failures, etc.) of a second type of HO failure, etc., but the example embodiments are not limited thereto and the desired threshold ratio may be any desired ratio set by a network operator, administrator, etc.

Moreover, the desired threshold conditions and/or desired MRO entry conditions are not limited to the examples discussed above. According to at least one example embodiment, other desired threshold conditions and/or desired MRO entry conditions may be used, and may be set by a network operator, network administrator, etc., for example, based on observed network conditions and observed mobility performance issues. Additionally, according to some example embodiments, more than one desired threshold condition may be used to determine whether a mobility problem exists at a specific cell-pair. For example, according to at least one example embodiment, a first desired threshold condition corresponding to a total number of handover failures may be set, and a second desired threshold condition corresponding to the number of TL HO failures equaling the number of TE HO failures may be set, etc., and if either desired threshold condition is met, the RAN node 110 determines that the mobility policy for a same cell-pair should be updated (e.g., determines that the mobility policy update procedure should be triggered), but the example embodiments are not limited thereto.

Referring back to FIG. 5, in operation S5020, once the RAN node 110 determines that the mobility policy for a particular same cell-pair should be updated, the RAN node 110 initiates a first mobility policy update procedure (e.g., initiate performance of an outer loop MRO, a first MRO, etc.), by transmitting a positioning service request to a network-based location service, such as the LMF 140, for each UE device currently being served by the RAN node 110 (e.g., a first set of UE devices), but the example embodiments are not limited thereto. As another example, the RAN node 110 may select a subset of UE devices being served, such as the UE devices currently located proximate to the cell-pair at issue, and request positioning service for those UE devices only, etc., but the example embodiments are not limited thereto. In operation S5030, the LMF 140 may then transmit and/or continuously transmit location information (e.g., position information) for each of the first set of UE devices. In operation S5040, the RAN node 110 may then collect the received location information of the first set of UE devices as historical position information of the first set of UE devices, as well as any HO status information, including HO failure information and HO success information, etc., received from the first set of UE devices, over a desired time period, and transmits (e.g., reports) to the CE 150 (e.g., a RIC and/or a OAM, etc.).

The CE 150, in operation S5050, may then analyze the collected historical UE position information and the collected HO status information to determine the areas of the border regions of the cell-pair where HO failures are prevalent (e.g., areas where the HO failures meet the desired MRO entry conditions), and the types of HO failures being observed in those areas. Then, based on the results of the analysis, the CE 150 may then generate area division mapping information, e.g., mapping information, etc., corresponding to at least one cell-pair identified as needing its mobility policy updated, etc.

According to some example embodiments, the CE 150 may generate the area division mapping information by dividing and/or sub-dividing the border regions into a plurality of subareas (e.g., boundary areas) associated with and/or corresponding to at least one cell-pair (e.g., the boundary between cell_1 and cell_2 of FIG. 1B) identified as needing its mobility policy updated based on the historical UE position information (e.g., analysis of the historical UE position information indicates that the desired MRO entry conditions are met). The CE 150 divides and/or sub-divides the border region of the identified cell-pair into boundary areas (e.g., the CE 150 sets the boundaries of each of the boundary areas) such that the HO failures observed in each boundary area in the collected HO status information corresponds to a single HO failure type and/or are predominately of a single HO failure type (e.g., is 80% or greater of a single HO failure type, etc.), etc., but the example embodiments are not limited thereto. Referring again to FIG. 1B, real-world boundary areas may correspond to geographical and/or navigational features, such as streets (e.g., S1, S2, S3, etc.), bridges, pathways, sidewalks, buildings, parks, and/or other routes and/or places where mobile UEs may congregate and/or travel, etc.

Once the relevant border regions have been divided, the CE 150 associates each boundary area with an area identifier (e.g., an area ID) in the generated area division mapping information and, in operation S5060, and assigns the boundary area with a specific mobility configuration parameter (e.g., a new mobility configuration parameter, an initial mobility configuration parameter and/or an updated mobility configuration parameter of an existing mobility configuration parameter, etc.) to correct the HO failures observed at that boundary area in the historical position information/HO status information. Additionally, the CE 150 may assign default mobility configuration parameter(s) values to be used in any other portion of the cell that has not been designated as a boundary area.

For example, as shown in the example mobility configuration parameter table according to at least one example embodiment of FIG. 7, the updated mobility configuration parameters may include updated cell individual offset (CIO) values, updated time-to-trigger (TTT) values, etc., corresponding to specific cell-pairs identified by their source cell ID, target cell ID and a source cell boundary area ID, such as the cell-pair/boundary area (cell_1, cell_2, source area ID 1), but the example embodiments are not limited thereto, and a greater or lesser number of mobility configuration parameters may also be included in the mobility configuration parameter table. As shown in FIG. 7, the cell-pair/boundary area (cell_1, cell_2, source area ID 1) may have an updated CIO value of "−2 dB," the cell-pair/boundary area (cell_1, cell_2, source area ID 2) may have an updated CIO value of "+4 dB," and the default value for all other regions of the cell pair (cell_1, cell_2) may have a CIO value of "+3 dB," etc. However, the example embodiments are not limited thereto and other mobility configuration parameters and/or parameter values may be used. Additionally, according to some example embodiments, the mobility configuration parameter tables may have different sets of mobility configuration parameter values for the same cell-pair/boundary areas, with the different sets of mobility configuration parameter values applicable for different conditions, such as different times of day, different network conditions, different UE types, and/or different UE velocity types, etc., but the example embodiments are not limited thereto.

At operation S5070, the CE 150 will transmit the area division mapping information to the LMF 140, and in operation S5080, the CE 150 will transmit the mobility configuration parameters (e.g., updated mobility configuration parameters) to the RAN node 110.

According to some example embodiments, the LMF 140 may then report the current location information of the current UEs (e.g., a set of second UEs, etc.) located in the serving area of the RAN node 110 to the RAN node 110 using the area IDs associated with the boundary areas included in the area division mapping information obtained from the CE 150 in operation S5090. According to at least one example embodiment, the set of second UEs may include the same UEs included in the set of first UEs, and/or may include different UEs than the UEs of the first set of UEs, etc., but the example embodiments are not limited thereto.

Additionally, in operation S5100, in response to the current boundary area ID information of each second UE (e.g., UE 130, etc.) obtained from the LMF 140, the RAN node 110 will assign the corresponding mobility configuration parameter associated with the current boundary area ID to the UE 130. For example, if LMF 140 reports that UE 130 is currently located in boundary area (source area ID 1), the RAN node 110 may assign the CIO value "−2 dB" to the UE 130, etc., but the example embodiments are not limited thereto.

In some example embodiments, in operation S5120, the RAN node 110 may also perform a second mobility policy update procedure (e.g., an inner loop MRO, a second MRO, etc.), but the example embodiments are not limited thereto, and in some example embodiments operations S5120 and/or S5130 may be optional. In operation S5120, the RAN node 110 may receive and/or collect updated KPI statistics and/or other network condition information reported by the UE device 130 after the assignment of the updated mobility configuration parameter settings, and the RAN node 110 may determine whether the mobility configuration parameter settings for the previously defined boundary areas (e.g., subareas, etc.) need to be adjusted based on the collected KPI statistics and a desired threshold condition. The desired threshold condition applied in operation S5120 may be the same desired threshold condition applied to the cell-pair in operation S5010, or may be a different desired threshold condition.

If the RAN node 110 determines that the mobility configuration parameter settings of one or more of the boundary areas needs to be adjusted, the RAN node 110 may adjust the mobility configuration parameter values for the specific boundary area based on the collected KPI statistics and the new current location information (e.g., current area ID information, etc.) of the second UEs, etc., but the example embodiments are not limited thereto.

In optional operation S5130, the RAN node 110 may also repeat operation S5010 and determine whether the mobility policy of at least one boundary area needs to be updated, e.g., determine whether a HO problem exists at one or more boundary areas, sub-areas, etc., of a specific cell-pair, based on the collected KPI statistics and the desired threshold condition, and then repeat the operations of FIG. 5. For example, the RAN node 110 may determine that the mobility policy of the (cell_1, cell_2, area ID 1) cell-pair/boundary area needs to be updated because the number of TL HO failures and the number of TE HO failures observed at a boundary area ID 1 during a desired time period are equal, etc., but the example embodiments are not limited thereto.

Figure 6:
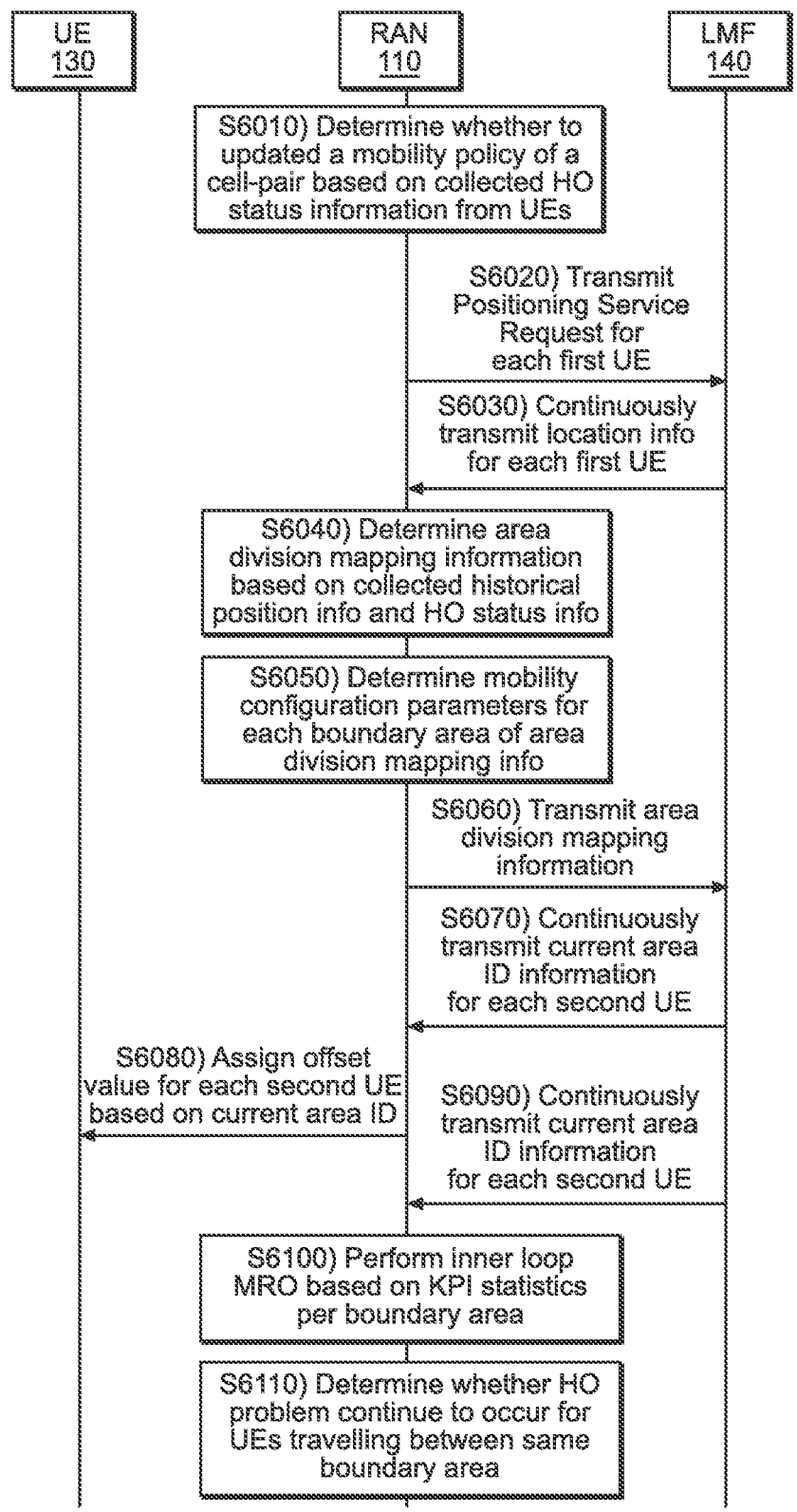
FIG. 6 illustrates a second example transmission flow diagram according to at least one example embodiment.

FIG. 6 illustrates a second example transmission flow diagram according to at least one example embodiment. More specifically, FIG. 6 illustrates a second example MRO method for reducing and/or optimizing handover (HO) failures and/or other radio link failures (RLF) experienced by UE devices in border regions corresponding to cell-pairs. In contrast to the first example MRO method illustrated in FIG. 5, the at least one example embodiment of FIG. 6 omits the CE 150 and the operations of the CE 150 may be performed by the RAN node 110, but the example embodiments are not limited thereto. Discussion of the same and/or similar concepts and/or features between FIGS. 5 and 6 will be omitted from the discussion of FIG. 6 for the sake of brevity, but may be equally applicable to the same/similar operation of FIG. 6, or vice versa.

According to some example embodiments, in operation S6010, similar to operation S5010 of FIG. 5, RAN node 110 may receive HO status information (e.g., network condition information, such as RLF reports, HO success reports, HO failure reports, etc.), from UE devices connected to and/or served by the RAN node 110 indicating that a HO failure has occurred. The RAN node 110 may then collect the HO status information from the one or more UE devices connected to the RAN node over a desired time period, and then determine whether to update a mobility policy of a particular cell-pair (e.g., determine whether a HO problem exists at the particular cell-pair, etc.) including the cell served by the RAN node 110 and any cell-pairs associated with the RAN node 110, e.g., same cell-pairs involving the cell served by the RAN node 110 and any of the neighboring cells of the neighboring RAN nodes, such as RAN node 120, etc. The RAN node 110 may determine that the mobility policy needs to be updated based on the collected HO status information and at least one desired threshold condition, e.g., may determine that a first mobility update procedure, a first MRO, an outer loop MRO, etc., is to be performed, but the example embodiments are not limited thereto.

In operation S6020, similar to operation S5020, the RAN node 110 initiates the first mobility policy update procedure (e.g., initiate performance of an outer loop MRO, a first MRO, etc.), by transmitting a positioning service request to a network-based location service, such as the LMF 140, for each UE device currently being served by the RAN node 110 (e.g., a first set of UE devices), but the example embodiments are not limited thereto. In operation S6030, similar to operation S5030, the LMF 140 may then transmit and/or continuously transmit location information (e.g., position information) for each of the first set of UE devices, etc.

According to at least one example embodiment, in operation S6040, in contrast to operations S5040 and S5050 of FIG. 5, the RAN node 110 collects the received location information of the first set of UE devices as historical position information of the first set of UE devices, as well as any HO status information, including HO failure information and HO success information, received from the first set of UE devices, over a desired time period, etc. The RAN node 100 then analyzes the collected historical UE position information and the collected HO status information to determine the areas of the border regions of the cell-pair where HO failures are prevalent, and the types of HO failures being observed in those areas, etc., but the example embodiments are not limited thereto. Based on the results of the analysis, the RAN node 110 generates the area division mapping information, e.g., mapping information, etc., corresponding to the at least one cell-pair identified as needing its mobility policy updated, etc. The RAN node 110 may generate the area division mapping information by dividing and/or sub-dividing the border regions into a plurality of subareas (e.g., boundary areas) associated with and/or corresponding to at least one cell-pair, so that the HO failures observed in each region in the collected HO status information corresponds to a single HO failure type and/or are predominately of a single HO failure type (e.g., is 80% or greater of a single HO failure type, etc.), etc., but the example embodiments are not limited thereto.

Further, in operation S6050, the RAN node 110 associates each boundary area with an area identifier (e.g., an area ID) in the generated area division mapping information and assigns the boundary area with a specific mobility configuration parameter (e.g., a new mobility configuration parameter, an initial mobility configuration parameter and/or an updated mobility configuration parameter of an existing mobility configuration parameter, etc.) to correct the HO failures observed at that boundary area in the historical position information/HO status information. Additionally, the RAN node 110 may assign default mobility configuration parameter(s) values to be used in any other portion of the cell that has not been designated as a boundary area, including other cell-pairs, etc.

At operation S6060, the RAN node 110 transmits the area division mapping information to the LMF 140, and in operation S6070, the LMF 140 will report the current location information of the current UEs located in the serving area of the RAN node 110 (e.g., a set of second UEs, etc.) to the RAN node 110 using the area IDs associated with the boundary areas included in the area division mapping information. According to at least one example embodiment, the set of second UEs may include the same UEs included in the set of first UEs, and/or may include different UEs than the UEs of the first set of UEs, etc., but the example embodiments are not limited thereto.

In operation S6080, similar to operation S5100, in response to the current boundary area ID information of each second UE (e.g., UE 130, etc.) obtained from the LMF 140, the RAN node 110 will assign the corresponding mobility configuration parameter associated with the current boundary area ID to the second UEs (e.g., UE 130), etc.

Next, the RAN node 110 may perform optional operation S6100, similar to operation S5120. In operation S6100, the RAN node 110 may perform a second mobility policy update procedure (e.g., an inner loop MRO, a second MRO, etc.) by receiving and/or collecting updated KPI statistics and/or other network condition information reported by the UE device 130 after the assignment of the updated mobility configuration parameter settings, and then determining whether the mobility configuration parameter settings for at least one of the previously defined boundary areas (e.g., subareas, etc.) needs to be adjusted based on the collected KPI statistics. If so, the RAN node 110 may adjust the mobility configuration parameter values for the at least one identified boundary area based on the collected KPI statistics and the new current location information (e.g., current area ID information, etc.) of the second UEs, etc., but the example embodiments are not limited thereto. In optional operation S6110, the RAN node 110 may also repeat operation S6010 and determine whether to update the mobility policy of at least one boundary area of a cell-pair (e.g., determine whether a HO problem exists at one or more cell-pair/boundary area ID, etc.) based on the collected KPI statistics and the at least one desired threshold condition, and then repeat the operations of FIG. 6.

Various example embodiments are directed towards a system for providing LMF-assisted MRO for UE devices travelling between network cells and/or stationary UEs capable of connecting to two or more cells. Accordingly, one or more example embodiments provide methods for improving the quality and reliability of wireless connections of UEs by reducing the amount of handover failures experienced at cell-pair boundaries.

More specifically, one or more of the example embodiments reduce the amount of handover failures experienced at cell-pair boundaries by using LMF assistance from the wireless network to determine historical and/or real-time location-based network statistics to sub-divide border and/or boundary regions between specific cell-pairs and provide boundary region specific MRO configuration settings, thereby reducing and/or eliminating the application of MRO configuration settings of the incorrect handover failure type at the boundary regions.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A radio access network (RAN) node, comprising:
a memory having computer readable instructions stored thereon; and
processing circuitry configured to execute the computer readable instructions to cause the RAN node to perform the following operations:
    collect network handover information associated with at least one first user equipment (UE) device traveling between at least one cell pair, the at least one cell pair including a cell served by the RAN node and at least one neighboring cell of the RAN node;
    transmit positioning service requests for each of the at least one first UE device to an network device;
    receive position information corresponding to each of the at least one first UE device from a location management function (LMF) network device in response to the transmitted positioning service requests;
    collect the received position information as historical position information for the at least one first UE device;
    determine whether to update a mobility policy associated with the RAN node based on the collected network handover information and a desired threshold condition;
    perform a first mobility policy update procedure for the RAN node based on results of the determination, wherein the performing comprises:
        generating mapping information based on the historical position information and the collected network handover information, wherein generating the mapping information comprises:
            determining boundaries for a plurality of boundary areas based on handover failure type information associated with each of the plurality of boundary areas included in the network handover information;
        updating the mobility configuration parameters for each of the plurality of boundary areas associated with the at least one cell pair, wherein the updated mobility configuration parameters includes an updated cell individual offset (CIO) value and an updated time-to-trigger (TTT) value;
        transmitting the determined mapping information to the LMF network device, and
        transmitting the updated mobility configuration parameters to the RAN node;
    transmit the historical position information to a centralized entity (CE) network device for each of the at least one first UE device, the historical position information including the network handover information corresponding to the at least one first UE device; and
    receive the updated mobility configuration parameters from the CE network device;
    receive current location information corresponding to at least one second UE device traveling between the at least one cell pair from the LMF network device in response to the performed first mobility policy update procedure, the current location information including a boundary area identifier of a current boundary area corresponding to the current location of the at least one second UE device; and
    assign updated mobility configuration parameters to the at least one second UE device based on the boundary area identifier, the received current location information of the at least one second UE device, and the mapping information associated with the cell served by the RAN node, the mapping information including a plurality of boundary areas associated with the at least one cell pair.

2. The RAN node of claim 1, wherein in response to the transmitted historical position information, the CE network device is caused to, generate the mapping information based on the historical position information and the network handover information, the generating the mapping information including determining boundaries for the plurality of boundary areas based on handover failure type information associated with each of the plurality of boundary areas included in the network handover information, update the mobility configuration parameters for each of the plurality of boundary areas, transmit the determined mapping information to the LMF network device, and transmit the updated mobility configuration parameters to the RAN node; and the RAN node is further caused to, receive the current location information corresponding to each of the at least one second UE device from the LMF network device, the current location information including a boundary area identifier of a current boundary area corresponding to the current location of the at least one second UE device, and assign the updated mobility configuration parameters to the at least one second UE device based on the boundary area identifier.

3. The RAN node of claim 2, wherein the CE network device is one of a RAN intelligent controller network device or an operations administration and maintenance (OAM) network device.

4. The RAN node of claim 3, wherein the collected network handover information includes a total number of too-late (TL) handovers and a total number of too-early (TE) handovers occurring at each of the at least one cell pair during a desired time period; and the desired threshold condition includes the total number of TL handovers equaling the total number of TE handovers during the desired time period.

5. The RAN node of claim 4, wherein the RAN node is further caused to: receive new current location information corresponding to the at least one second UE device traveling between the at least one cell pair from the LMF network device in response to the assigned updated offset value to each at least one second UE device; perform a second mobility policy update procedure in real-time based on the new current location information, the performing the second mobility policy update procedure including, collecting key performance indicator (KPI) information associated with each of the plurality of boundary areas of the mapping information in real-time, determining whether to update the mobility policy associated with each of the plurality of boundary areas based on the collected KPI information and a desired threshold condition, and updating the mobility configuration parameters for the determined boundary areas based on the collected KPI information.

6. A system comprising:
a radio access network (RAN) node;
a memory having computer readable instructions stored thereon; and
processing circuitry configured to execute the computer readable instructions to cause the RAN node to perform the following operations:
collect network handover information associated with at least one first user equipment (UE) device traveling between at least one cell pair, the at least one cell pair including a cell served by the RAN node and at least one neighboring cell of the RAN node;
transmit positioning service requests for each of the at least one first UE device to an network device;
receive position information corresponding to each of the at least one first UE device from a location management function (LMF) network device in response to the transmitted positioning service requests;
collect the received position information as historical position information for the at least one first UE device;
determine whether to update a mobility policy associated with the RAN node based on the collected network handover information and a desired threshold condition;
perform a first mobility policy update procedure for the RAN node based on results of the determination, wherein the performing comprises:
generating mapping information based on the historical position information and the collected network handover information, wherein generating the mapping information comprises:
determining boundaries for a plurality of boundary areas based on handover failure type information associated with each of the plurality of boundary areas included in the network handover information;
updating the mobility configuration parameters for each of the plurality of boundary areas associated with the at least one cell pair, wherein the updated mobility configuration parameters includes an updated cell individual offset (CIO) value and an updated time-to-trigger (TTT) value;
transmitting the determined mapping information to the LMF network device, and
transmitting the updated mobility configuration parameters to the RAN node;
transmit the historical position information to a centralized entity (CE) network device for each of the at least one first UE device, the historical position information including the network handover information corresponding to the at least one first UE device; and
receive the updated mobility configuration parameters from the CE network device;
receive current location information corresponding to at least one second UE device traveling between the at least one cell pair from the LMF network device in response to the performed first mobility policy update procedure, the current location information including a boundary area identifier of a current boundary area corresponding to the current location of the at least one second UE device; and
assign updated mobility configuration parameters to the at least one second UE device based on the boundary area identifier, the received current location information of the at least one second UE device, and the mapping information associated with the cell served by the RAN node, the mapping information including a plurality of boundary areas associated with the at least one cell pair.

7. The system of claim 6, wherein in response to the transmitted historical position information, the CE network device is caused to, generate the mapping information based on the historical position information and the network handover information, the generating the mapping information including determining boundaries for the plurality of boundary areas based on handover failure type information associated with each of the plurality of boundary areas included in the network handover information, update the mobility configuration parameters for each of the plurality of boundary areas, transmit the determined mapping information to the LMF network device, and transmit the updated mobility configuration parameters to the RAN node; and the RAN node is further caused to, receive the current location information corresponding to each of the at least one second UE device from the LMF network device, the current location information including a boundary area identifier of a current boundary area corresponding to the current location of the at least one second UE device, and assign the updated mobility configuration parameters to the at least one second UE device based on the boundary area identifier.

8. The system of claim 7, wherein the CE network device is one of a RAN intelligent controller network device or an operations administration and maintenance (OAM) network device.

9. The system of claim 8, wherein the collected network handover information includes a total number of too-late (TL) handovers and a total number of too-early (TE) handovers occurring at each of the at least one cell pair during a desired time period; and the desired threshold condition includes the total number of TL handovers equaling the total number of TE handovers during the desired time period.

10. The system of claim 9, wherein the RAN node is further caused to: receive new current location information corresponding to the at least one second UE device traveling between the at least one cell pair from the LMF network device in response to the assigned updated offset value to each at least one second UE device; perform a second mobility policy update procedure in real-time based on the new current location information, the performing the second mobility policy update procedure including, collecting key performance indicator (KPI) information associated with each of the plurality of boundary areas of the mapping information in real-time, determining whether to update the mobility policy associated with each of the plurality of boundary areas based on the collected KPI information and a desired threshold condition, and updating the mobility configuration parameters for the determined boundary areas based on the collected KPI information.

11. A method comprising:
  collecting network handover information associated with at least one first user equipment (UE) device traveling between at least one cell pair, the at least one cell pair including a cell served by the RAN node and at least one neighboring cell of the RAN node;
  transmitting positioning service requests for each of the at least one first UE device to an network device;
  receiving position information corresponding to each of the at least one first UE device from a location management function (LMF) network device in response to the transmitted positioning service requests;
  collecting the received position information as historical position information for the at least one first UE device;
  determining whether to update a mobility policy associated with the RAN node based on the collected network handover information and a desired threshold condition;
  performing a first mobility policy update procedure for the RAN node based on results of the determination, wherein the performing comprises:
    generating mapping information based on the historical position information and the collected network handover information, wherein generating the mapping information comprises:
      determining boundaries for a plurality of boundary areas based on handover failure type information associated with each of the plurality of boundary areas included in the network handover information;
      updating the mobility configuration parameters for each of the plurality of boundary areas associated with the at least one cell pair, wherein the updated mobility configuration parameters includes an updated cell individual offset (CIO) value and an updated time-to-trigger (TTT) value;
      transmitting the determined mapping information to the LMF network device, and
      transmitting the updated mobility configuration parameters to the RAN node;
    transmitting the historical position information to a centralized entity (CE) network device for each of the at least one first UE device, the historical position information including the network handover information corresponding to the at least one first UE device; and
    receiving the updated mobility configuration parameters from the CE network device;
  receiving current location information corresponding to at least one second UE device traveling between the at least one cell pair from the LMF network device in response to the performed first mobility policy update procedure, the current location information including a boundary area identifier of a current boundary area corresponding to the current location of the at least one second UE device; and
  assigning updated mobility configuration parameters to the at least one second UE device based on the boundary area identifier, the received current location information of the at least one second UE device, and the mapping information associated with the cell served by the RAN node, the mapping information including a plurality of boundary areas associated with the at least one cell pair.

12. The method of claim 11, wherein in response to the transmitted historical position information, the CE network device is caused to, generate the mapping information based on the historical position information and the network handover information, the generating the mapping information including determining boundaries for the plurality of boundary areas based on handover failure type information associated with each of the plurality of boundary areas included in the network handover information, update the mobility configuration parameters for each of the plurality of boundary areas, transmit the determined mapping information to the LMF network device, and transmit the updated mobility configuration parameters to the RAN node; and the RAN node is further caused to, receive the current location information corresponding to each of the at least one second UE device from the LMF network device, the current location information including a boundary area identifier of a current boundary area corresponding to the current location of the at least one second UE device, and assign the updated mobility configuration parameters to the at least one second UE device based on the boundary area identifier.

13. The method of claim 12, wherein the CE network device is one of a RAN intelligent controller network device or an operations administration and maintenance (OAM) network device.

14. The method of claim 13, wherein the collected network handover information includes a total number of too-late (TL) handovers and a total number of too-early (TE) handovers occurring at each of the at least one cell pair during a desired time period; and the desired threshold condition includes the total number of TL handovers equaling the total number of TE handovers during the desired time period.

15. The method of claim 14, further comprising:
  receiving new current location information corresponding to the at least one second UE device traveling between the at least one cell pair from the LMF network device in response to the assigned updated offset value to each at least one second UE device;
  performing a second mobility policy update procedure in real-time based on the new current location information, the performing the second mobility policy update procedure including;
  collecting key performance indicator (KPI) information associated with each of the plurality of boundary areas of the mapping information in real-time;
  determining whether to update the mobility policy associated with each of the plurality of boundary areas based on the collected KPI information and a desired threshold condition; and
  updating the mobility configuration parameters for the determined boundary areas based on the collected KPI information.

* * * * *